United States Patent
Pappu et al.

(10) Patent No.: US 10,789,310 B2
(45) Date of Patent: Sep. 29, 2020

(54) FACT MACHINE FOR USER GENERATED CONTENT

(71) Applicant: Yahoo Holdings, Inc., Sunnyvale, CA (US)

(72) Inventors: Aasish Kumar Pappu, Rego Park, NY (US); Sungjin Lee, Edgewater, NJ (US); Joel Ranjan Tetreault, New York, NY (US); Amanda Joy Stent, Chathan, NJ (US)

(73) Assignee: Oath Inc., New York, NY (US)

( * ) Notice: Subject to any disclaimer, the term of this patent is extended or adjusted under 35 U.S.C. 154(b) by 0 days.

(21) Appl. No.: 15/198,493

(22) Filed: Jun. 30, 2016

(65) Prior Publication Data
US 2018/0004718 A1   Jan. 4, 2018

(51) Int. Cl.
| | | |
|---|---|---|
| *G06F 40/35* | (2020.01) | |
| *G06F 40/166* | (2020.01) | |
| *G06F 16/9535* | (2019.01) | |
| *G06F 40/00* | (2020.01) | |
| *G06F 40/20* | (2020.01) | |
| *H04L 12/58* | (2006.01) | |
| *G06F 40/205* | (2020.01) | |

(52) U.S. Cl.
CPC ........ *G06F 16/9535* (2019.01); *G06F 40/205* (2020.01); *G06F 40/35* (2020.01); *H04L 51/16* (2013.01); *H04L 51/32* (2013.01)

(58) Field of Classification Search
CPC .. G06F 17/241; G06F 17/278; G06F 17/2785; G06F 17/30401; G06F 17/30528; G06F 17/30554; G06F 17/30696; G06F 17/30864; G06F 16/9535; G06F 40/205; G06F 40/35; H04L 51/16; H04L 51/32
See application file for complete search history.

(56) References Cited

U.S. PATENT DOCUMENTS

| | | | | |
|---|---|---|---|---|
| 8,275,769 | B1* | 9/2012 | Suh | G06Q 10/101 705/319 |
| 8,843,466 | B1* | 9/2014 | Zeiger | G06F 16/951 707/706 |
| 10,114,869 | B2* | 10/2018 | Becker | G06F 16/24578 |
| 2003/0033333 | A1* | 2/2003 | Nishino | G06F 16/9562 715/255 |
| 2005/0144251 | A1* | 6/2005 | Slate | H04L 29/06 709/215 |
| 2006/0259473 | A1* | 11/2006 | Li | G06Q 30/02 |
| 2010/0042910 | A1* | 2/2010 | Manolescu | G06F 17/241 715/202 |
| 2010/0262454 | A1* | 10/2010 | Sommer | G06F 16/355 706/20 |
| 2011/0106895 | A1* | 5/2011 | Ventilla | H04L 12/66 709/206 |
| 2012/0005221 | A1* | 1/2012 | Ickman | G06F 17/30528 707/769 |

(Continued)

*Primary Examiner* — Ariel Mercado
(74) *Attorney, Agent, or Firm* — Cooper Legal Group, LLC

(57) ABSTRACT

A fact machine receives a comment string from a webpage and segments the comments into sub-conversations. The fact machine also identifies entities within comments or draft comments as well as a sentiment and/or attributes associated with the entity. The fact machine then queries a knowledge base for facts relating to the entity, the attributes, and/or the sentiment. The fact machine then provides the facts to a user prior to the user posting a draft comment.

20 Claims, 8 Drawing Sheets

(56) References Cited

U.S. PATENT DOCUMENTS

| | | | |
|---|---|---|---|
| 2012/0179751 A1* | 7/2012 | Ahn | G06Q 30/0282 |
| | | | 709/204 |
| 2013/0103389 A1* | 4/2013 | Gattani | G06F 17/28 |
| | | | 704/9 |
| 2015/0113018 A1* | 4/2015 | Steed | G06F 16/2465 |
| | | | 707/776 |
| 2017/0249389 A1* | 8/2017 | Brovinsky | G06F 17/30867 |
| 2017/0270425 A1* | 9/2017 | Danson | G06N 20/00 |
| 2017/0300823 A1* | 10/2017 | Bostick | H04L 67/306 |

* cited by examiner

FACT MACHINE FOR USER GENERATED CONTENT

TECHNICAL FIELD

This disclosure relates to machines and complex system architectures for providing facts related to user generated content, including comments posted on webpages.

BACKGROUND

Many social media websites, forums, and other online resources allow individual users to post comments for display on the online resources. These comments may be related to a particular webpage, article, item of content, online resource, product, service, or another particular or general topic provided by or otherwise facilitated by the online resource. The comments may be public or private. Often, the comments are part of online discussions within a comment string. Typical commenting systems or interfaces enable users to freely post comments without regard for the substantive content or positions in the comment. Further, many commenting systems rely exclusively on user comments and user interaction to facilitate discussion or activity within the comment string.

BRIEF DESCRIPTION OF THE DRAWINGS

The systems and methods may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

DETAILED DESCRIPTION

Figure 1:
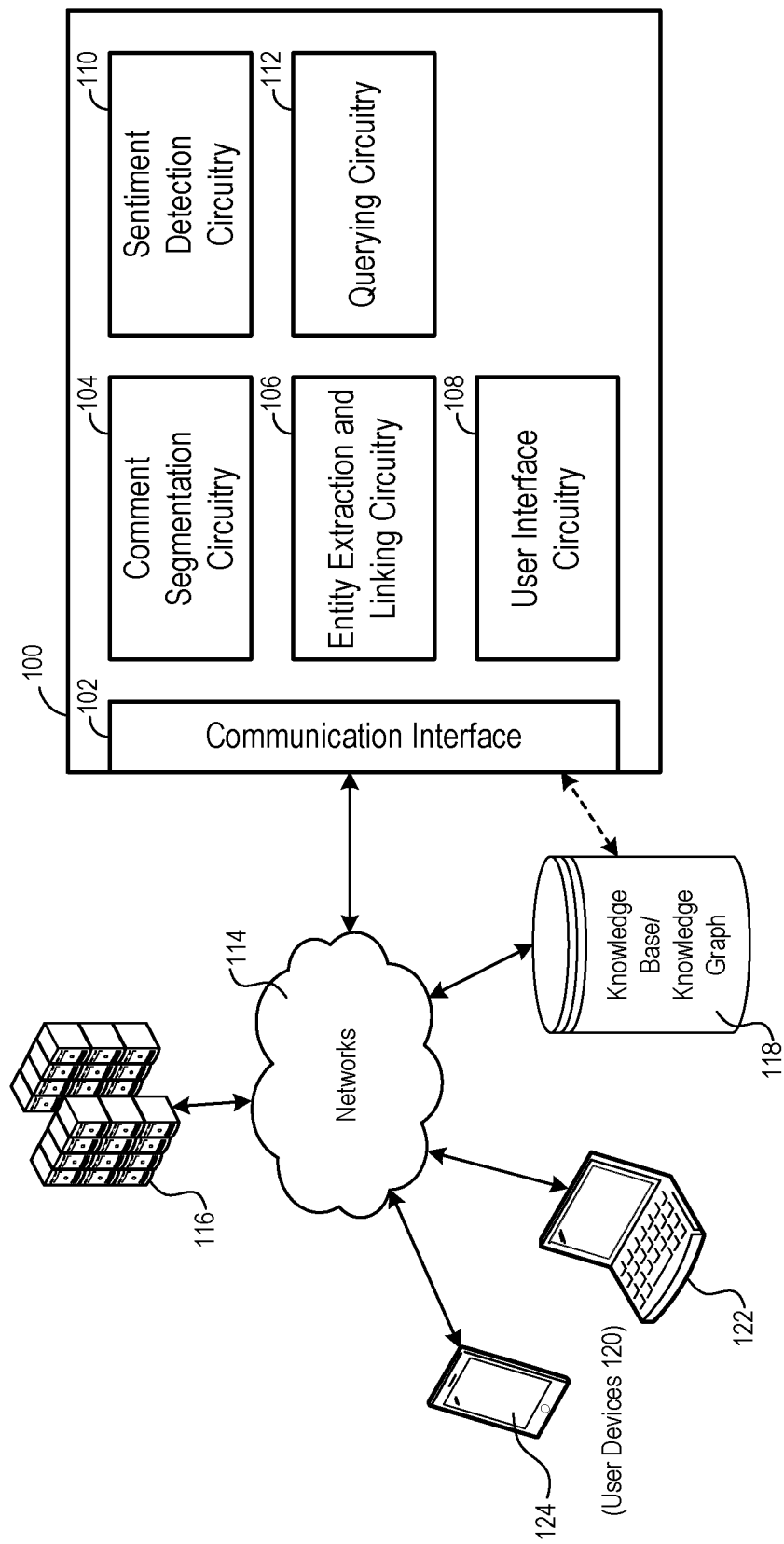
FIG. 1 is an example block diagram of a system architecture of a fact machine.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, circuitry, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

By way of introduction, a fact machine 100 may receive user generated content including previously posted comments or a draft comment that has not yet been posted. The fact machine 100 may segment various individual comments within a comment string into different sub-conversations. The fact machine 100 may also determine one or more entities referenced in the various sub-conversations. The fact machine 100 may query a knowledge base for a fact relating to the entity and may provide that fact to a user. In such a manner, a user can be provided with facts pertinent to an entity referenced in an individual comment or a sub-conversation. The presentation of the fact to the user may serve to stimulate further informative and constructive comments, or edits to draft comments, that contribute to the ongoing sub-conversation or overall comment string.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below.

Turning now to FIG. 1, an example block diagram of system architecture of a fact machine 100 is shown in accordance with various embodiments. FIG. 1 also illustrates an example contextual setting for the fact machine 100 in accordance with various embodiments. The fact machine 100 may include communication interface circuitry 102, comment segmentation circuitry 104, entity extraction and linking circuitry 106, user interface circuitry 108, sentiment detection circuitry 110, and querying circuitry 112. Each of the circuitry elements 102-112 may be co-located within a single computer device or server, or may be spread across multiple different systems or servers and are interconnected through various networks 114, such as an intranet and/or the Internet. In one approach, the fact machine 100 uses the circuitry elements 102-112 to communicate with and interact with local or remotely located computing devices or computing cluster to perform the various functions discussed below. For example, the machine 100 and/or the circuitry elements 102-112 therein may communicate (e.g., via communication interface circuitry 102 and networks 114) with remote computing devices 116 (such a cloud computing server or cluster) to perform various functions discussed herein.

The various circuitry elements 102-112 (and particularly, the entity extraction and linking circuitry 106 and/or the querying circuitry 112) may communicate with a knowledge base 118, which may also comprise a knowledge graph. The machine 100 may communicate with the knowledge base 118 directly or through the networks 114. The knowledge base 118 may include a knowledge graph that may be maintained or curated by a same entity that operates the fact machine 100 (e.g., YAHOO!). Alternatively or additionally, the knowledge graph may reference or derive information from other sources, such as THE WORLD FACTBOOK, WIKIDATA, WIKIPEDIA, DBPEDIA, FREEBASE, or the like. In certain embodiments or uses, the knowledge base 118 may also be one or more online resources discoverable through a general Internet search query, for example, using the YAHOO! search engine.

User devices 120 may also be connected to the networks 114, including, for example, a computer 122 (e.g., laptop) and/or a smartphone 124. The user devices 120 may be computing devices that allow a user to connect to a network 114, such as the Internet. Examples of a user device include, but are not limited to, a personal computer, personal digital assistant ("PDA"), a laptop, a smartphone, a cellular phone, a tablet, or other electronic device. The user device 120 may include a keyboard, keypad, a touch screen interface, or a cursor control device, such as a mouse, or a joystick, a display device, a remote control, and/or any other device operative to view webpages including content and sponsored content. In one embodiment, the user device 120 is configured to request and receive information from the networks 114, for example, using a web browser, such as INTERNET EXPLORER® (sold by Microsoft Corp., Redmond, Wash.) or FIREFOX® (provided by Mozilla).

The user devices 120 may access a webpage provided by a webserver that is co-located with the fact machine 100 or is remote from the fact machine 100 (e.g., remote computing devices 116). The user devices 120 may be presented with a comment string associated with the webpage via the webserver. For example, if the webpage is for a particular news or opinion article, the comment string may provide various users (including the user(s) of the user devices 120) with the opportunity to construct and post comments relating to the article (or another topic) within the comment string. Many other webpage types include comment strings, including, for example, social media webpages, forum webpages, news webpages, product sales webpages, product review webpages, travel webpages, or nearly any other webpage. The webserver may display individual comments of the comment string in a time-based manner (e.g., the most recent comment at top or the earliest comment at top). The webserver may also display comments in the comment string in a logical manner wherein users are allowed to select another existing individual comment or individual comment thread within the larger comment string to respond to. The webserver may display comments of the comment string in other arrangements as well, for example, with a most-viewed comment at top, a most active comment thread at top, a highest rated comment at top, a most-helpful comment at top, and the like.

The fact machine 100 may operate as part of the webserver that provides the webpages discussed above, or may be a separate machine that operates in coordination with the webserver to provide a fact service for comments of the webpage. For example, the fact machine 100 may provide a fact service which the webserver providing the webpage may call, reference, or otherwise evoke as part of its webpage.

The communication interface circuitry 102 may include various communication interfaces between the fact machine 100 and other external components. The communication interface circuitry 102 may be connected or configured to connect to the networks 114, including the Internet or an intranet, to enable the fact machine 100 and the system circuitry therein to communicate with other systems and devices. The communication interface circuitry 102 may include wireless and/or wired communication hardware and may implement wired and/or wireless communication protocols such as, for example, Ethernet, Gigabit Ethernet, asynchronous transfer mode protocols, passive and synchronous optical networking protocols, Data Over Cable Service Interface Specification (DOCSIS) protocols, EPOC protocols, synchronous digital hierarchy (SDH) protocols, Multimedia over coax alliance (MoCA) protocols, digital subscriber line (DSL) protocols, cable communication protocols, and/or other networks and network protocols, or wireless communication protocols such as Bluetooth, Wi-Fi, WLAN, near field communication protocols, cellular protocols (2G, 3G, 4G, LTE/A), and/or other wired or wireless protocols. Additionally, the communication interface circuitry 102 may include system buses to effect intercommunication between various elements, components, and circuitry portions of the fact machine 100 (e.g., via one or more buses, computer component interfaces, or peripheral component interfaces). Example system bus implementations include PCIe, SATA, and IDE-based buses.

Figure 2:
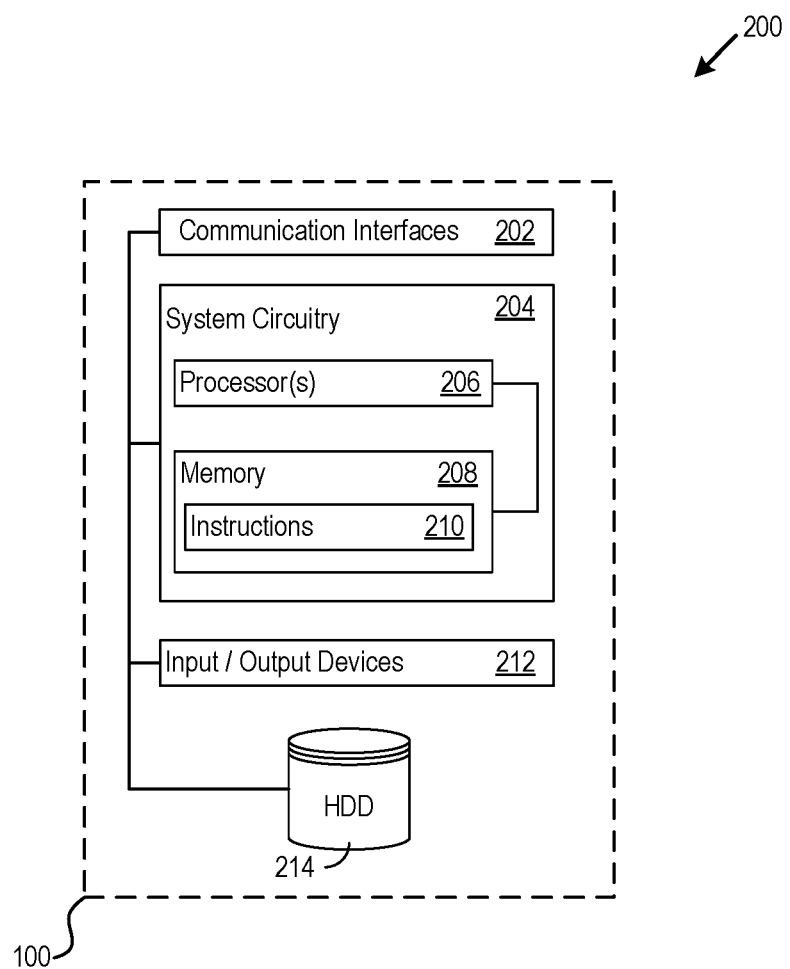
FIG. 2 is an example block diagram of a specific implementation of the fact machine of FIG. 1.

With brief reference to FIG. 2, an example block diagram of a specific implementation 200 of the fact machine 100 is illustrated in accordance with various embodiments. In one approach, the fact machine 100 includes system circuitry 204 to support implementation of the various circuitry elements and functionality discussed above with respect to FIG. 1 and elsewhere. In one embodiment, the system circuitry 204 includes processors 206, memory 208, and/or other circuitry. The processors 206 may be connected to the memory 208 and may comprise a memory system including a plurality of memory devices collocated or distributed across multiple systems. The memory 208 may store control instructions 210 and/or operational parameters for the control instructions, datasets, and other information. The control instructions 210 may be executed by the processor 206 to implement any of the functions described below, according to a configuration set by various operational parameters. In some embodiments, various circuitry elements of the fact machine 100 may be implemented by the system circuitry 204. For example, the comment segmentation circuitry 104, the entity extraction and linking circuitry 106, the user interface circuitry 108, the sentiment detection circuitry 110, and/or the querying circuitry 112 may be implemented in whole or in part by one or more instances of the system circuitry 204.

As shown in the specific implementation 200, the fact machine 100 may also include communication interfaces 202, which may correspond to communication interface circuitry 102 shown in FIG. 1. The fact machine 100 may also include one or more input/output devices 212 to enable, for example, local maintenance engineers to interact with the fact machine 100. For example, the input/output devices 212 may include a display, other human interface devices, and/or other communication interfaces to enable local or remote interaction therewith. The fact machine 100 may include a hard drive disc 214 or other storage device internally maintained or otherwise coupled thereto. The hard drive disc 214 may include copies of the operating instructions 210 or other data or instructions used by the fact machine 100 to implement the functions described herein. In certain embodiments, the fact machine 100 is implemented as or on one or more server devices or as a stand-alone computing device that may be interconnected to other devices or to the networks 114.

In operation, the fact machine 100 may receive comment strings of existing comments posted on a webpage. Alternatively, the fact machine 100 may receive a draft comment that a user has drafted, or is presently drafting, but has not yet posted. In one approach, the comment segmentation circuitry 104 of the fact machine 100 can segment the comment string into multiple different sub-conversations based on topics within the sub-conversations. The comment segmentation circuitry 104 may determine topic shifts as points of delineation between different sub-conversations. The entity extraction and linking circuitry 106 of the fact machine 100 can then determine one or more entities referenced within the comment string or within the draft comment. By segmenting the comment string into different sub-conversations, the entity extraction and linking circuitry 106 may be able to disambiguate entities referenced with the sub-conversations with increased accuracy due to the smaller number of comments and/or the limited topic scope in which the entity is referenced. For example, for a comment string posted on a webpage about Ronald Reagan, different sub-conversations within the comment string may discuss different aspects of Ronald Reagan. For example, one sub-conversation may discuss Ronald Reagan the President, while another sub-conversation may discuss Ronald Reagan the actor (although these are the same person, in one example, they may represent different entities within a knowledge graph or another database). If the comment segmentation circuitry 104 detects topic shifts between these two separate sub-conversations such that these two topics are delineated, the entity extraction and linking circuitry 106 can more accurately disambiguate the different entities referenced in each sub-conversation (e.g., Ronald Reagan the President instead of the actor).

In one example, sentiment detection circuitry 110 can detect a polarized sentiment about the identified entity. For, the sentiment detection circuitry 110 may analyze words and phrases surrounding or relating to the identified entity to extract a sentiment about the entity. In one approach, the sentiment is a polarized sentiment, such as a positive sentiment about the entity or a negative sentiment about the entity. In another example, sentiment detection circuitry 110 can detect polarized sentiments about many different entities within a sub-conversation or a draft comment. The sentiment detection circuitry 110 may determine an entity with the most polarized sentiment within the sub-conversation or within the draft comment as a polarized entity. The fact machine 100 may then make the polarized entity the subject of further fact services provided by the fact machine 100.

The querying circuitry 112 of the fact machine may then perform a query of a knowledge base 118 for one or more facts relating to the entity. For example, the querying circuitry 112 may perform an Internet search query for a fact relating to the entity, or may query an entity database including entity root objects representing different entities. The querying circuitry 112 may perform simple string searches or approximate string matching to account for missing characters or misspellings. Further, the querying circuitry 112 can determine matching scores for particular facts, which can be presented to the user via a graphical user interface. As discussed above, the entity may be a polarized entity such that any facts discovered might relate to a strong polarized position that the commenter may have taken about an entity in an existing comment or presently is taking in a draft comment.

In certain approaches, the entity extraction and linking circuitry 106 may determine an attribute associated with the entity from the individual comment, the sub-conversation, or the draft comment. The querying circuitry 112 may then perform the query of the knowledge base for facts relating not only to the identified entity, but also the particular attribute. For example, if the identified entity is President Ronald Reagan, and another portion of a comment discussing President Ronald Reagan mentions "approval rating," the entity extraction and linking circuitry 106 may determine "approval rating" as an attribute of entity President Ronald Reagan. The querying circuitry 112 may then perform a query of the knowledge base for President Ronald Reagan as well as "approval rating" to find at least one fact related to both the identified entity and the identified attribute.

The user interface circuitry 108 of the fact machine 100 may then present the fact determined by the querying circuitry 112 to a user of a user device 120 that is viewing the website and/or has drafted or is drafting a comment for posting within the comment string. For example, the fact can be presented to a user drafting a comment prior to the user submitting the comment. In one approach, the user may be presented with an option to include the fact within the comment before or after posting the comment. In another approach, the user may review the presented fact and may change their comment or, alternatively, feel more confident in their comment (e.g., possibly including the fact in the comment to support their position). In yet another approach, the fact machine 100 may add comments or facts to an existing comment string, for example, within sub-conversations or close to comments with strong polarizing language about entities. In one approach, the fact machine 100 presents facts that support a particular polarized sentiment about an entity to support a point of view or argument expressed in the comment or sub-conversation. In another approach, the fact machine 100 presents facts without regard to the particular sentiment expressed (e.g., positive or negative) and simply presents facts related to a polarized entity and possibly a discussed attribute.

So configured, the fact machine 100 may present facts to a user that the user may not have been aware of that relate to a comment string or a draft comment. In this manner, the fact machine 100 may help improve user-driven digital journalism and drive intelligent conversation. Further, the fact machine 100 can present facts to a user while drafting a comment (e.g., prior to posting) to help a user compose their comment such that the user may create engaging and informative comments, which in turn encourages constructive discussions between users.

Figure 3:
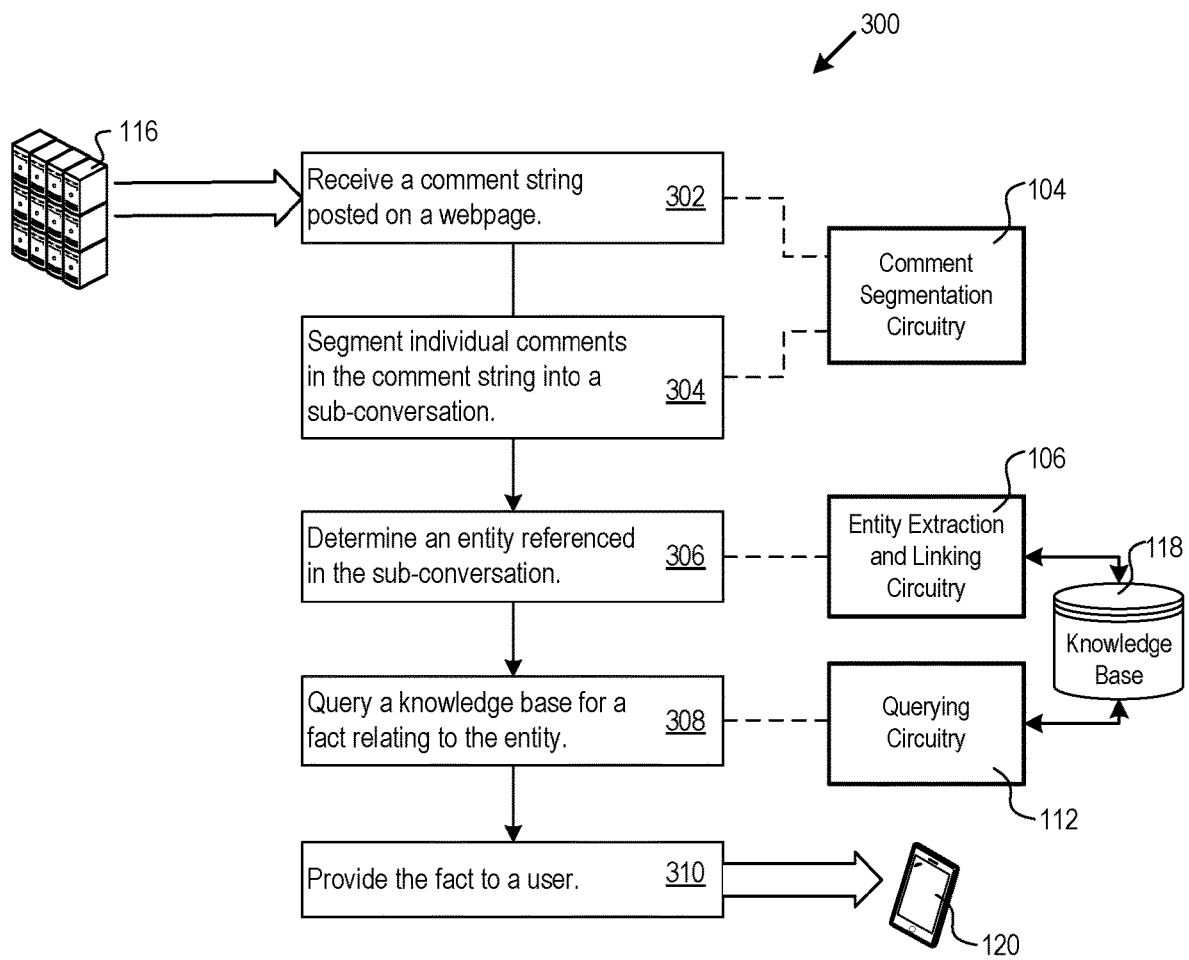
FIG. 3 shows an example flow diagram of logic that the fact machine may implement.

Operations of the fact machine 100 and its various circuitry elements are described in more detail with simultaneous reference to FIG. 1 and FIGS. 3-6. FIG. 3 illustrates an example flow diagram of logic 300 that the fact machine 100 may implement in various embodiments. The fact machine 100, and in particular, the comment segmentation circuitry 104, may receive a comment string posted or otherwise existing on a webpage (302). The fact machine 100 may receive the comment string from a remote server or remote computing devices 116 through the networks 114 via the communication interface circuitry 102. Alternatively, the comment string may be stored locally or within the same intranet as the fact machine 100. The comment string may include multiple individual comments and the metadata associated with each comment, for example, the username of the user that posted the comment, the date and time of posting the comment, and/or any interconnection to any other comments within the comment string (e.g., one comment being responsive to another). The fact machine 100 may receive the entire comment string during a single communication session (e.g., at one time) or may receive portions of the comment string, for example, as portions are updated or new comments are posted.

In one embodiment, the comment segmentation circuitry 104 of the fact machine 100 segments individual comments of the received comment string into one or more sub-conversations (304). In one approach, each comment of the comment string is segmented into a different sub-conversation. In another approach, various individual comments may be segmented into multiple different sub-conversations. In another approach, some individual comments may not be segmented into any sub-conversations.

Figure 4:
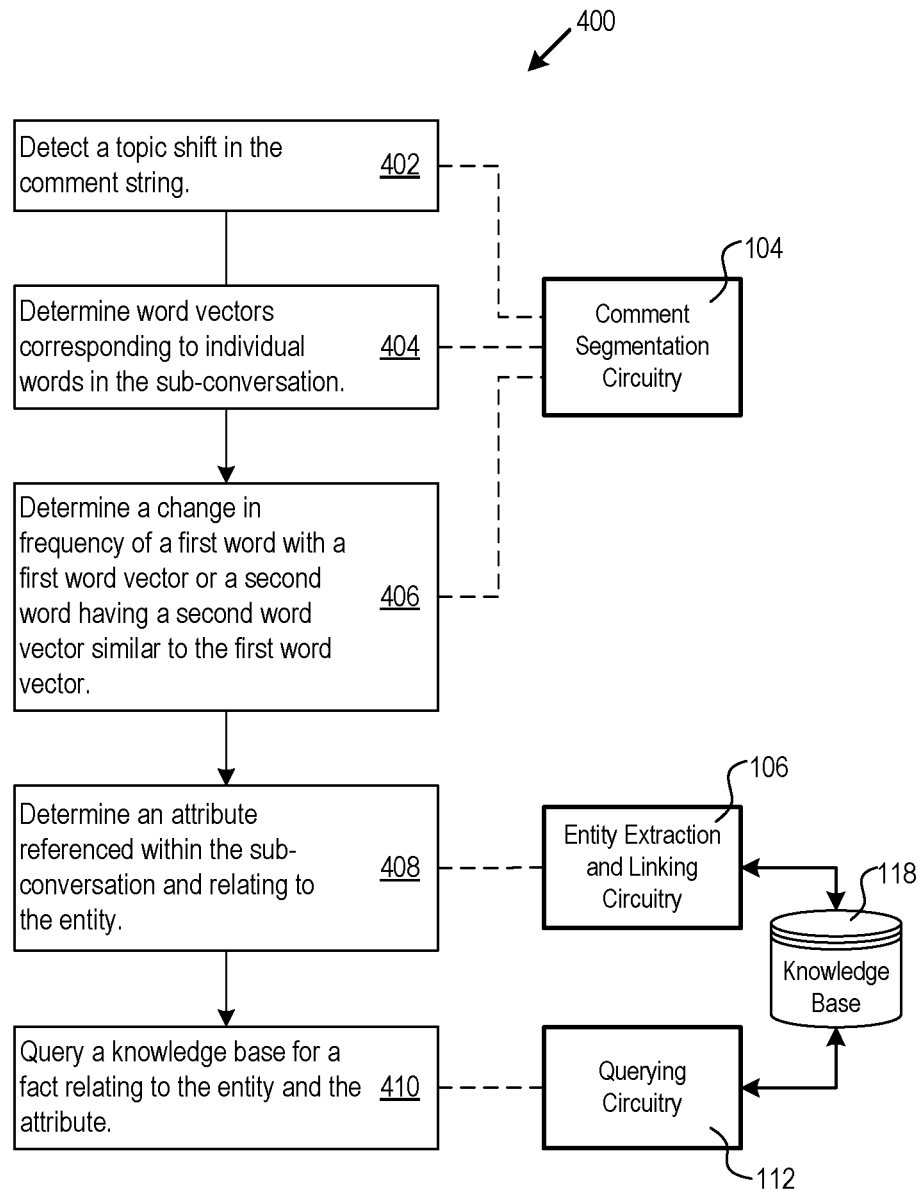
FIG. 4 shows another example flow diagram of logic that the fact machine may implement.

Turning briefly to FIG. 4, which illustrates an example flow diagram of logic 400 that the fact machine 100 may implement in various embodiments, various example methods in which the comment segmentation circuitry 104 may segment the comments of the comment string into different sub-conversations are illustrated. In one approach, the comment segmentation circuitry 104 may detect a topic shift within a comment string (402). For example, the comment segmentation circuitry 104 may determine where a topic shift occurs within a comment string, and use that location to indicate delineation between one sub-conversation and another sub-conversation. In one approach, to detect a topic shift, the comment segmentation circuitry 104 detects a change in the frequency of one or more words within the comment string. For example, if a set of individual comments includes multiple uses of a particular word, but then a neighboring set of individual comments does not include many or any occurrences of the word, or includes many instances of a different word, then the comment segmentation circuitry 104 may determine that a topic shift has occurred. In other embodiments, the comment segmentation circuitry 104 may utilize semantic parsing to determine topic shifts.

In another approach, the comment segmentation circuitry 104 may look at the frequency of similar words (instead of identical or directly related words) within the comment string. For example, to detect a topic shift, in one embodiment, the comment segmentation circuitry 104 may determine word vectors corresponding to individual words within a sub-conversation or within the entire comment string (404). For example, the comment segmentation circuitry 104 may determine a plurality of word vectors, one word vector for each individual word of each comment of the comment string or within the sub-conversation. The comment segmentation circuitry 104 may utilize known word vector technology to determine the plurality of word vectors, including, for example, word embedding technology, language modeling, or natural language processing techniques as are understood in the art. A specific example of a word embedding technology is WORD2VEC, which creates word vectors from words input into the model. The comment segmentation circuitry 104 may use the plurality of word vectors to detect a change in a frequency of appearance of a word and/or other words similar to that word. For example, the comment segmentation circuitry 104 may detect a change in frequency of appearance of a first individual word having a first word vector or a second individual word having a second word vector that is similar to the first word vector (406). Because the two word vectors are similar, the two words are considered to be similar. The comment segmentation circuitry 104 can then examine the frequency of appearance of similar words (rather than only identical or directly related words) to determine the occurrence of a topic shift.

Word similarity may be specified by a word vector similarity threshold that sets a maximum limit on a difference between the multiple word vectors for the corresponding words. Words with word vectors that have a difference lower than the word vector similarity threshold may be considered to be similar words. In another approach, the comment segmentation circuitry 104 may utilize a clustering approach to cluster sentences or sets of words with other similar words or similar word vectors to form the sub-conversations. In yet another approach, a supervised learning technique can be implemented wherein individual users are asked to annotate topic shifts within a comment string. In such a manner, a learning model can be taught how to identify topic shifts within the comment strings.

Returning to FIG. 3, with the comment string segmented into sub-conversations, the entity extraction and linking circuitry 106 can identify one or more entities referenced within the sub-conversation (306). In one embodiment, the entity extraction and linking circuitry 106 can traverse, search, or query a knowledge graph (e.g., as part of knowledge base 118) to determine if individual words or groups of words within the individual comments of the comment string match with any individual entities within the knowledge graph. An entity is a person, a place, a thing, or an event. Typically, though not always, the entity is of some significance or notoriety because a root object (e.g., entity listing) must typically be created for the entity within an entity database. An individual entity within the entity database may comprise a single root object within the entity database. Example entity databases include THE WORLD FACTBOOK, WIKIDATA, WIKIPEDIA, DBPEDIA, FREEBASE, or other similar entity databases.

The entity extraction and linking circuitry 106 may implement one or more entity recognition technologies and/or techniques as are known and understood. For example, in natural language processing, entity recognition may include known technologies such as entity linking, named entity disambiguation (NED), named entity recognition and disambiguation (NERD), or named entity normalization (NEN). The entity extraction and linking circuitry 106 may link the identified entity within the knowledge graph to the words forming the entity identified in the language of the comments. As mentioned above, the entity extraction and linking circuitry 106 may perform entity disambiguation at a sub-conversation level to help improve the accuracy of the entity disambiguation process through the limited scope and size of the sub-conversation.

The querying circuitry 112 may be provided with the identified entity by the entity extraction and linking circuitry 106. The querying circuitry 112 may then perform a query of a knowledge base 118 to determine a fact relating to the entity (308). In one embodiment, the querying circuitry 112 provides general facts relating simply to the entity. In other embodiments, the querying circuitry 112 may perform queries pertaining to particular aspects of the entity.

Turning again to FIG. 4, additional steps are illustrated within the method 400 relating to the query for a fact. The entity extraction and linking circuitry 106 may determine an attribute referenced within an individual comment, a sub-conversation, or a draft comment that relates to or is otherwise associated with the identified entity (408). In one approach, the entity extraction and linking circuitry 106 may search the knowledge graph to determine any first or second level (or deeper) attributes associated with the entity that are also mentioned within the individual comment, the sub-conversation, or a draft comment. The entity extraction and linking circuitry 106 may utilize a radius of words from the identified entity that it may examine for attributes. For example, the entity extraction and linking circuitry 106 may only look for attributes up to 10 words away from a reference to an entity. In another example, the entity extraction and linking circuitry 106 may determine a likelihood that an identified attribute pertains to the entity based partially on a distance between the attribute and the entity. The entity extraction and linking circuitry 106 may only determine attributes as being related to entities if the likelihood is determined to be higher than a probability threshold. Once the entity extraction and linking circuitry 106 has determined an attribute related to the entity, the querying circuitry 112 may query the knowledge base 118 for a fact relating to both the entity and the attribute (410). In this manner, the querying circuitry may provide a fact that is more directly pertinent to the content of the comments or the sub-conversation.

Attributes are generally aspects or elements related to the entity. For example, if the entity is a movie star, an attribute may be a list of movies in which the actor has acted in (e.g., a first-level attribute). Another attribute for an actor may include box office performance of all movies in which the actor has acted (e.g., a second-level attribute for the movie star, which may be discoverable by looking up the box office performances for each move included in the list of movies in which the actor has acted).

In many configurations, a knowledge graph or knowledge base 118 is arranged in "tuples," which include an entity, an attribute, and a value for that attribute. Thus, for example, if the entity is Bill Clinton, an attribute may be president number, and the value may be 42, indicating that Bill Clinton was the 42nd president of the United States. In another example, a particular movie (entity) may have a box office (attribute) that is populated with the box office revenue (value). Similarly, a professional athlete (entity) may have a particular statistic (attribute) that is populated with a value for the statistic (value). In this manner, the knowledge base can be searched for an entity and an associated attribute and a particular value can be provided as a fact to the user.

Returning to FIG. 3, upon completion of the query by the querying circuitry 112, the user interface circuitry 108 of the fact machine 100 can provide the fact to the user (310). The fact may be presented to the user as a table, a graph, a text statement of fact, an image, or any other form of consumable data that is related to the entity. The user interface circuitry 108 may provide the fact to a user before a user posts a draft comment, possibly with an option to post the fact within the comment. The user may elect to include the provided fact within the comment prior to posting the comment. Alternatively, the user interface circuitry 108 may present the fact after the user posts the comment and provides the user with an option to edit their posted comment or post a follow-on reply comment with the suggested fact.

In another embodiment, the user interface circuitry 108 automatically posts the fact as a new comment within the comment string or within a pertinent sub-conversation. The user interface circuitry 108 may provide an option for human users to provide feedback as to the pertinence of the automatic new comment including the fact. With this feedback, the fact machine 100 can review its own performance based on human feedback and can adjust or retrain any models or algorithms accordingly with the feedback data, thereby teaching the fact machine 100 to provide more pertinent suggested facts.

Figure 5:
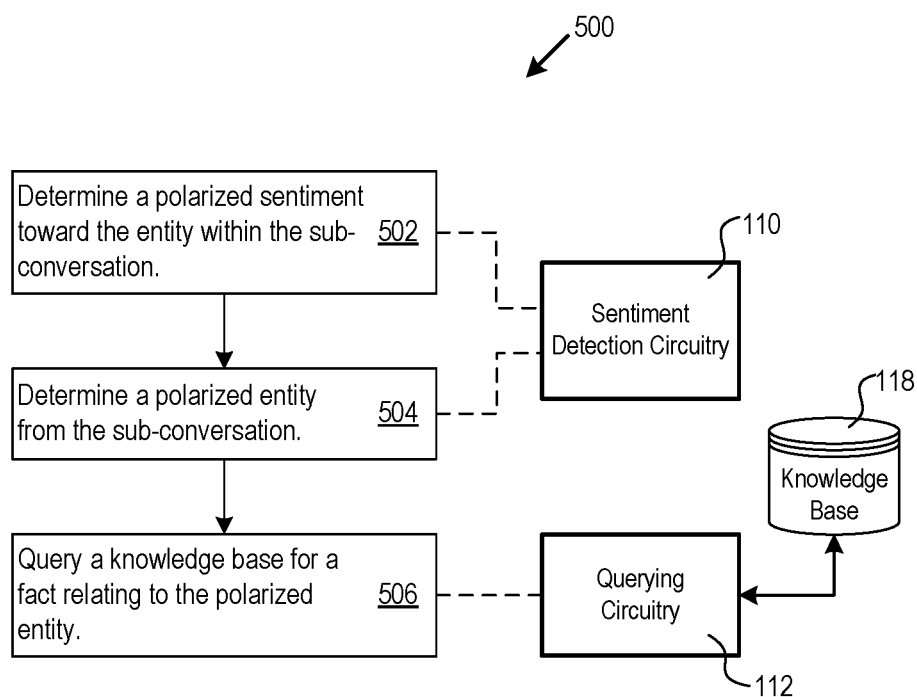
FIG. 5 shows another example flow diagram of logic that the fact machine may implement.

FIG. 5 illustrates another example flow diagram of logic 500 that the fact machine 100 may implement in various embodiments. In an optional embodiment, the sentiment detection circuitry 110 may determine a polarized sentiment expressed toward or about the identified entity (or toward an attribute associated with the identified entity) within an individual comment of the sub-conversation, within the sub-conversation, or within the entire comment string (502). For example, a comment may express a positive or a negative polarized sentiment about a particular entity. For example, a comment on a webpage about Ronald Reagan may include a positive sentiment, stating, for example, "From what I remember, Ronald Reagan had one of the highest approval ratings." The sentiment detection circuitry 110 may detect this positive sentiment within the comment or the surrounding comments toward the particular entity.

In one approach, the sentiment detection circuitry 110 may compare words (e.g., all words or many words) within an individual comment or multiple comments against a sentiment dictionary (for example, which may be stored within the knowledge base 118 or elsewhere) to determine which words include polarizing sentiment. Example words with polarizing sentiment include "love," "terrible," "best," "agree," "disagree," "different," "highest," "lowest," "yes," "not," and so forth. In one approach, the sentiment detection circuitry 110 can determine a distance (in number of words) between the polarizing sentiment word and the entity within the comment or comments. In some approaches, the closer the sentiment word is to the entity, the higher the probability is that the polarizing sentiment applies to the entity. The sentiment detection circuitry 110 may implement other techniques to determining sentiment within comments. For example, the sentiment detection circuitry 110 may utilize natural language processing trained models specifically trained to detect polarizing sentiment words and/or their relation to entities.

In another approach, the sentiment detection circuitry 110 may determine at least one polarized entity from a set of identified entities within the comment or sub-conversation (504). For example, if the entity extraction and linking circuitry 106 has identified multiple entities within a comment or a sub-conversation, the sentiment detection circuitry 110 may then determine which of those multiple identified entities has associated therewith a polarizing sentiment included within the comment or sub-conversation. For example, a comment may state "As president of the United States, Bill Clinton had one of the highest approval ratings." Entity extraction and linking circuitry 106 may identify at least two entities listed in the above example comment: United States (or president of the United States) and Bill Clinton. The sentiment detection circuitry 110 may then detect the positive polarizing sentiment and determine that it relates to the entity Bill Clinton and not to the entity United States. The sentiment detection circuitry 110 may then determine that the entity Bill Clinton is a polarized entity of the multiple identified entities. If multiple identified entities are associated with sentiments within the comments, the sentiment detection circuitry 110 may determine which entity is associated with the most extreme sentiment (e.g., "hate" being more extreme than "don't like") and identify that entity as the polarized entity.

After identifying the polarized entity, the sentiment detection circuitry 110 may flag or otherwise indicate the polarized entity as such. The querying circuitry 112 may then query the knowledge base 118 for facts relating to the polarized entity, for example, instead of a non-polarized entity or an entity having a less extreme polarization (506). The user interface circuitry 108 can then present the fact relating to the polarized entity to the user, as in step 310. Accordingly, the selected fact that is displayed to the user relates to the polarized entity having the most extreme sentiment expressed in the comment or sub-conversation.

Polarized entities are likely the subject of an argument or a point of view expressed within the comments. By presenting facts relating to polarized entity, the fact machine 100 enables users to support their point of view expressed in the comments (e.g., by including the suggested fact within the comment), or, alternatively, adjust their position or their draft comment according to facts or data presented by the fact machine 100.

Figure 6:
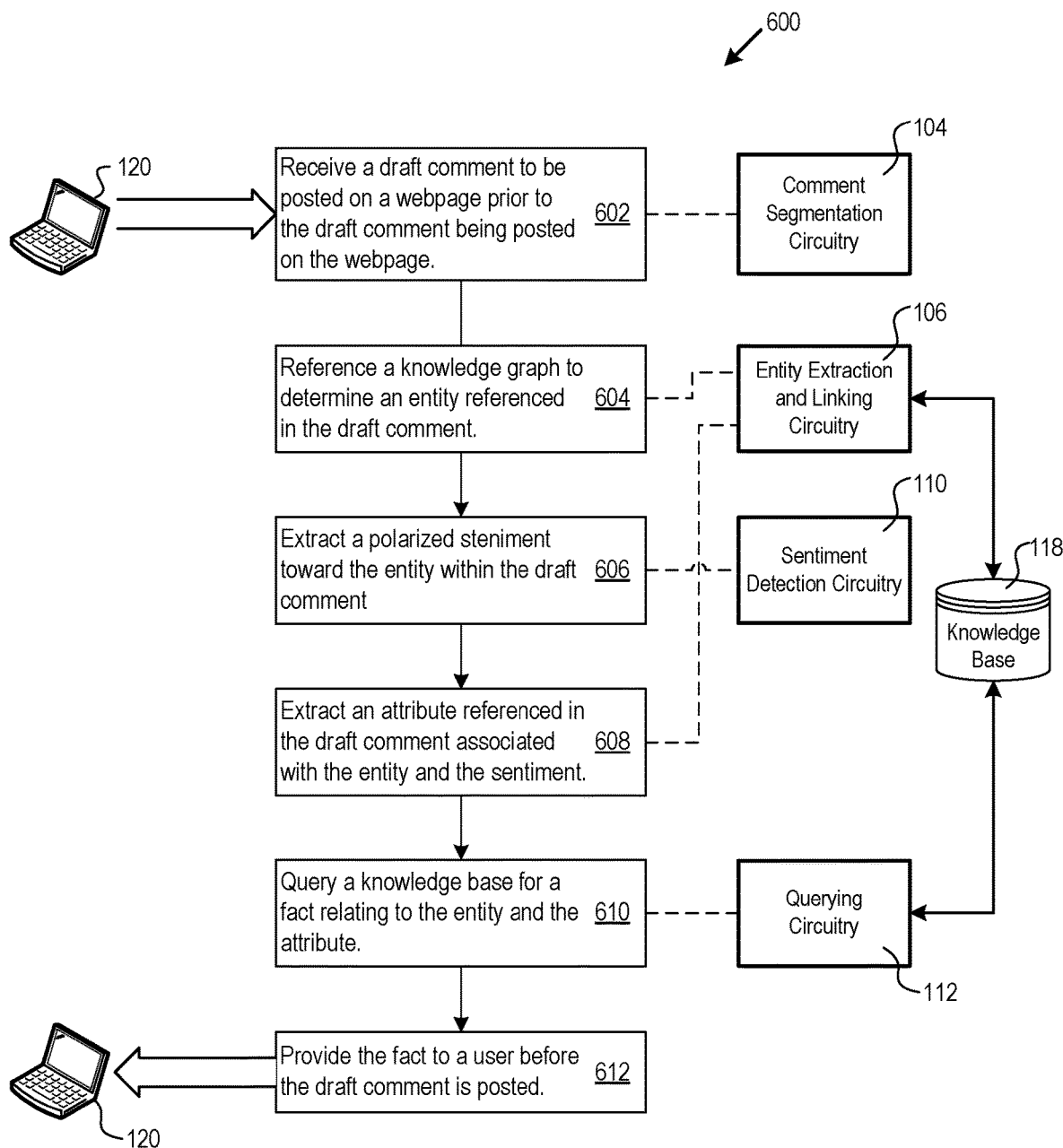
FIG. 6 shows another example flow diagram of logic that the fact machine may implement.

FIG. 6 illustrates another example flow diagram of logic 600 that the fact machine 100 may implement in various embodiments. In one embodiment, the fact machine 100 may provide facts to a user before the user submits or posts a draft comment on the web page. Alternatively, the fact machine 100 may provide facts in real time or near-real time while a user is drafting a draft comment to post on a webpage. The fact machine 100, and particularly the comment segmentation circuitry 104 and/or the entity extraction and linking circuitry 106, can receive from a user device 120 a draft comment to be posted on the webpage prior to the draft comment being posted on the webpage (602). The user device 120 (or a webserver that provides the webpage and that is in communication with the user device 120 and the fact machine 100) may send the draft comment to the fact machine 100 prior to it being posted on the webpage by the user. In another embodiment, the fact machine 100 receives continuous data or burst data that includes the draft comment as it is being drafted and changed by the user. For example, as the user enters more word or letters, the draft comment changes and those changes are communicated to the fact machine 100 in real-time or near-real-time.

As discussed before, the entity extraction and linking circuitry 106 may reference a knowledge graph (e.g., as part of a knowledge base 118) to determine at least one entity referenced within the draft comment (604). The sentiment detection circuitry 110 may extract a polarized sentiment within the draft comment that is directed toward the identified entity (606). The entity extraction and linking circuitry 106 can also extract an attribute referenced within the draft comment that is associated with the entity and with the sentiment (608). The comment may include a sentiment that is expressed about or in connection with a particular attribute associated with the entity. For example, if a comment states "Bill Clinton had a high approval rating," then the determined positive sentiment of "high" may relate both to Bill Clinton (as the entity) and his approval rating (as the attribute). If a draft comment includes two or more attribute about an entity, the fact machine may select an attribute associated with the sentiment (e.g., as determined by sentiment detection circuitry 110). In one approach, the sentiment detection circuitry 110 determines an attribute that is closest to the sentiment word, or an attribute that natural language processing models determine is related to a sentiment word, to be the identified attribute.

After the sentiment detection circuitry 110 identifies both the entity and the associated attribute, the querying circuitry 112 may query the knowledge base 118 for a fact relating to both the entity and the identified attribute (610). Lastly, user interface circuitry 108 can provide the fact to the user prior to the user posting the draft comment to the webpage (612). In one embodiment, the fact machine 100, and particularly the user interface circuitry 108, can provide the fact to the user before the user even completes drafting the draft comment. For example, as soon as the fact machine 100 determines an entity within the draft comment, and possibly a sentiment and/or an attribute, the fact machine 100 may provide facts to the user. As the user continues to draft the draft comment, the fact machine 100 may update or change the provided fact or facts in response to additional language being added to or changed within the draft comment. In one approach, the user interface circuitry 108 provides an option for the user to include the provided fact as part of the draft comment prior to posting. Accordingly, once the draft comment is posted, it may include the fact as was suggested by the fact machine 100.

Figure 7:
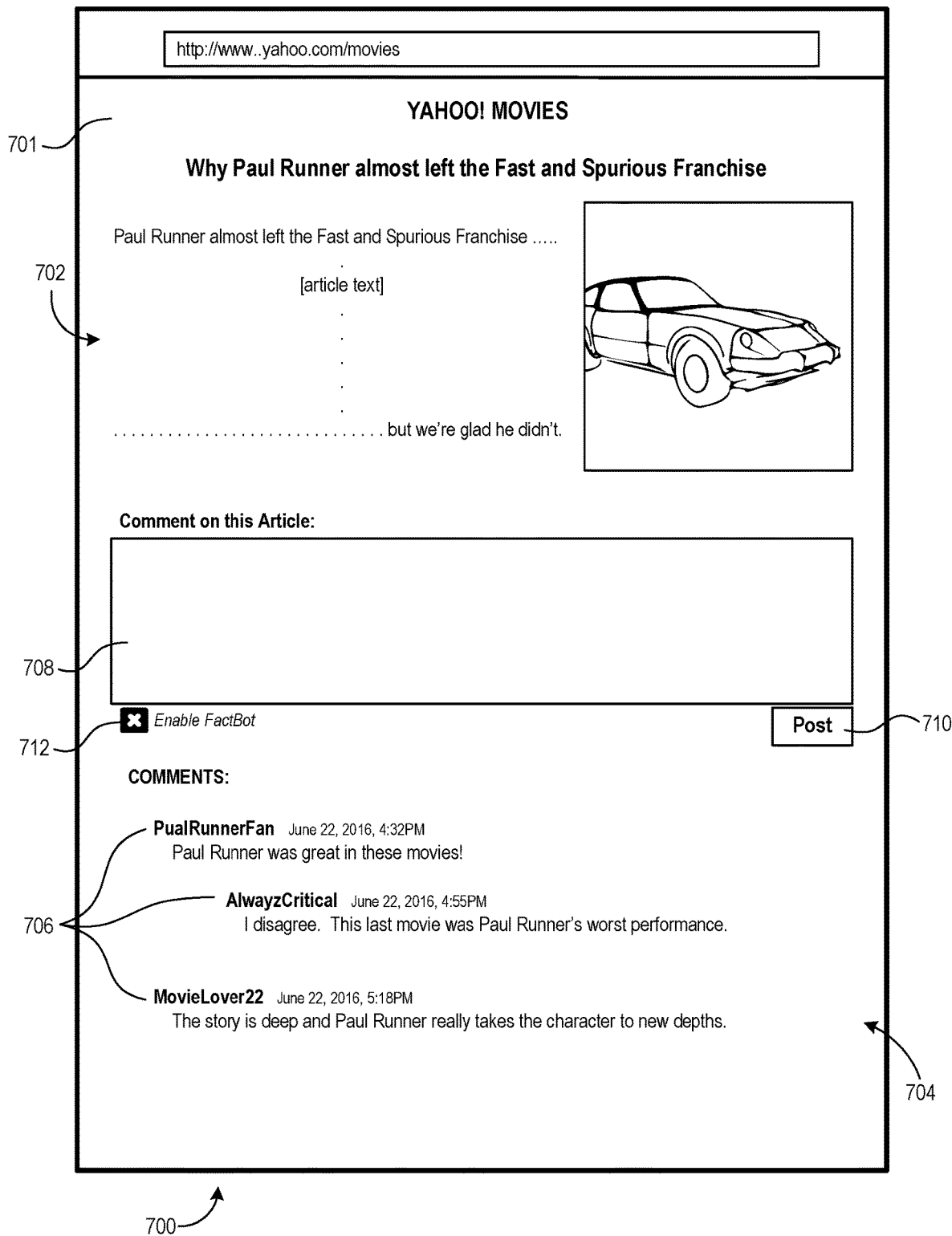
FIG. 7 illustrates an example user interface.
Figure 8:
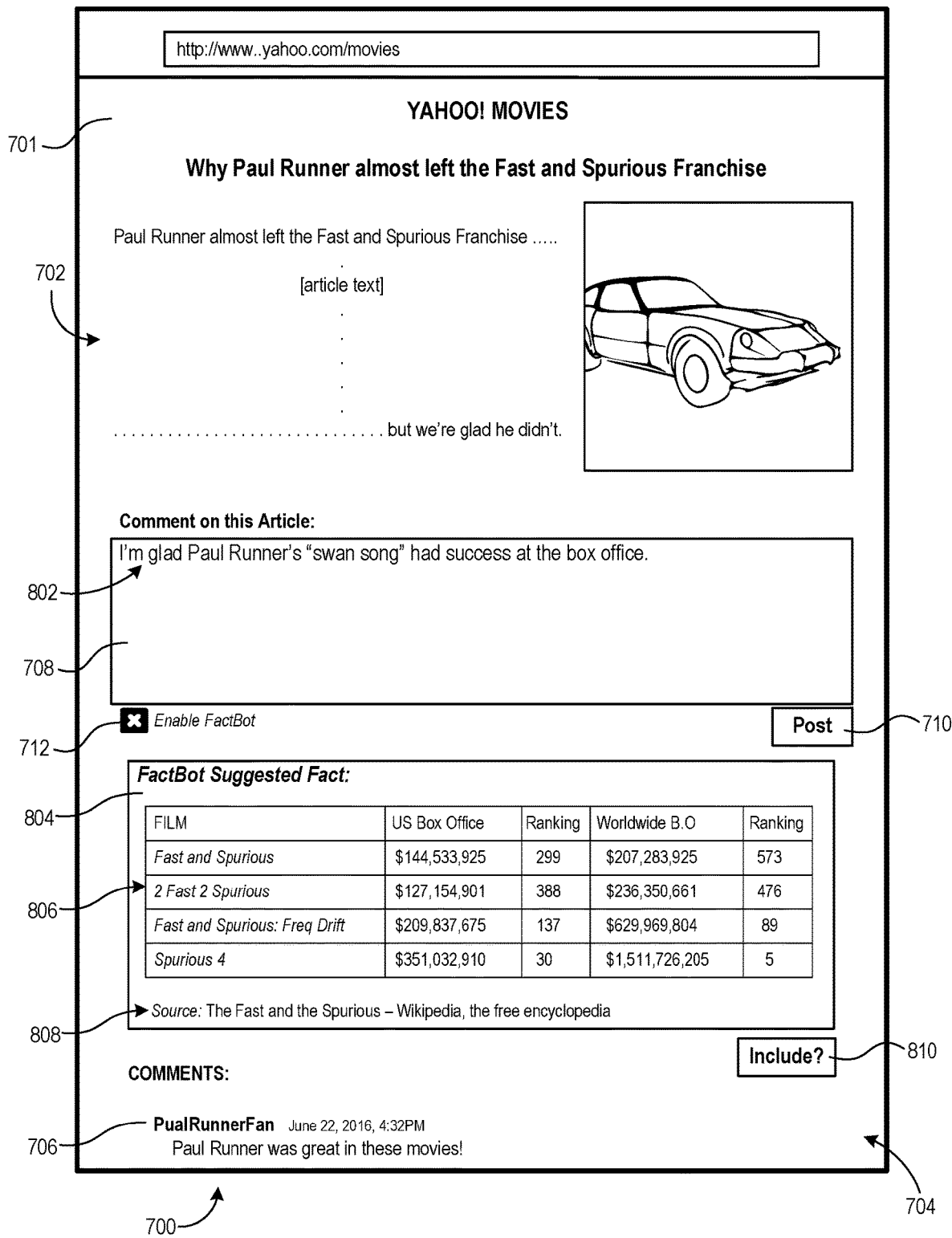
FIG. 8 illustrates a variation of the example user interface of FIG. 7.

FIGS. 7 and 8 illustrate an example graphical user interface (GUI) 700. The GUI 700 may include a webpage 701 as may be provided to a user device 120 and displayed on a display panel of the user device 120. The user device 120 may access the webpage 701 using a web browser or the like. The webpage 701 may be provided by a webserver such as, for example, a webserver that is remote from or co-located with the fact machine 100. In this example (though not in every example), the webpage 701 includes an article or other content 702. The webpage 701 also includes a comment section 704 that allows users to post individual comments 706 within a comment string, the individual comments 706 typically relating to the content 702 of the webpage. The webpage 701 may include a comment entry box 708 or area to enable a user to draft a new comment to post to the comment string. A post button 710 or a similar interface may enable a user to post a comment once drafted. A "FactBot" enable button 712 may provide a user with an option to disable or enable the fact machine 100 from providing suggested or relevant facts.

FIG. 8 illustrates the GUI 700 and the webpage 701 after a user has drafted a draft comment 802 within the comment entry box 708, but before the user has posted the draft comment 802 (e.g., via the post button 710). At some time either during the drafting of the draft comment 802 or after the draft comment 802 is completed (e.g., as indicated by a period or other punctuation, or after a segment of time has passed since the user has entered any new words), the fact machine 100, and particularly the user interface circuitry 108, may alter the display of the webpage 701 (or work with the providing webserver to alter the webpage 701) to include a suggested fact. For example, the user interface circuitry 108 may add a fact presentation area 804 to the webpage 701. The fact presentation area 804 may be presented below (as shown), above, to the side of, or within the comment entry box 708. The user interface circuitry 108 may present the fact presentation area 804 as a pop-up, a floating element, a bubble, or as another graphical element within the webpage 701 for viewing by the user. The user interface circuitry 108 may include within the fact presentation area 804 any relevant fact 806 as was determined by the fact machine 100 in accordance with the processes discussed above. The user interface circuitry 108 may present the fact 806 as a table, a graph, text, an image, a video, or any other visual or audible form of digital content that conveys the determined fact 806. The fact presentation area 804 may also include an indicator 808 of the source of the fact 806 (here shown as WIKIPEDIA). The user interface circuitry 108 may provide the user with a button 810 or other graphical element that provides the user with the option to include the suggested fact 806 as part of the draft comment 802 for posting to the comment string. Posted comments that include facts provided by the fact machine 100 may include a graphical indication (such as an icon or a different coloring) that the fact was suggested by the fact machine 100.

So configured, and in various embodiments, the fact machine 100 operates as a passive intelligent agent to provide suggested or otherwise pertinent facts to a user based on a user's individual draft comment, the context of comments in which the user may post the draft comment, and/or the context of an existing individual comment or sub-conversation. The fact machine 100 can help guide users while drafting comments prior to posting the comments by providing the user with facts that may support the user's point of view or position set forth in the draft comment. Further, the fact machine 100 can provide or insert facts within sub-conversations relative to the sub-conversation to evoke further intelligent conversation on a particular topic. Thus, in accordance with various embodiments, the fact machine 100 can provide users with facts that help users create comments that are engaging and informative while fostering an environment for constructive and enlightening conversation. Although reference is made throughout this disclosure to comments, the teachings disclosed herein may be applicable to other types of user generated content including, for example, blog posts, instant messages, text messages, or any other form of published or unpublished user generated content.

The present disclosure contemplates a computer-readable medium that includes instructions or receives and executes instructions responsive to a propagated signal, so that a device connected to a network can communicate voice, video, audio, images or any other data over a network, and/or perform any features or functionalities disclosed herein. A "computer-readable medium," "machine readable medium," "propagated-signal" medium, and/or "signal-bearing medium" may comprise any device that includes, stores, communicates, propagates, or transports instructions, code, or software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The methods, devices, processing, circuitry, structures, architectures, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Herein, the phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The invention claimed is:

1. A method comprising:
    receiving, by comment segmentation circuitry, a comment string posted on a webpage comprising a plurality of individual comments;
    responsive to determining that a frequency of appearance of a first individual word having a first word vector and one or more second individual words having one or more second word vectors within a word vector similarity threshold of to the first word vector changes a threshold amount from a first portion of the comment string having a first frequency of the first individual word and the one or more second individual words to a second portion of the comment string having a second frequency of the first individual word and the one or more second individual words, detecting, by the comment segmentation circuitry, at least one topic shift in the comment string to indicate a delineation between at least two sub-conversations;
    based upon the delineation between the at least two sub-conversations, segmenting, by the comment segmentation circuitry, the plurality of individual comments into the at least two sub-conversations comprising a first sub-conversation discussing a first aspect of a topic represented by a first text string and a second sub-conversation discussing a second aspect of the same topic represented by a second text string, wherein the second aspect is different than the first aspect but the second text string is the same as the first text string;
    determining, by entity extraction and linking circuitry, at least a first entity referenced in the first sub-conversation as the same topic and a second entity referenced in the second sub-conversation as the same topic;
    querying, by querying circuitry, a knowledge base for at least one fact relating to at least one of the first entity or the second entity;
    responsive to accessing the at least one fact:
        automatically generating a new comment comprising the at least one fact that has been accessed; and
        automatically posting the new comment comprising the at least one fact within a sub-conversation determined to be pertinent to the new comment;
    providing, by user interface circuitry, an option for one or more users to provide feedback corresponding to a pertinence of the new comment to the sub-conversation;
    receiving, via the option, feedback data corresponding to the pertinence of the new comment to the sub-conversation; and
    evaluating the feedback data and adjusting one or more models of a fact machine based upon the feedback data.

2. The method of claim 1 wherein the sub-conversation comprises at least one of the first sub-conversation or the second sub-conversation.

3. The method of claim 1 comprising:
    receiving, from a user device, a draft comment to be posted on the webpage prior to the draft comment being posted on the webpage;
    determining, by the entity extraction and linking circuitry, the first entity from the draft comment; and
    providing, by the user interface circuitry, the at least one fact to a user before the draft comment is posted on the webpage.

4. The method of claim 3 comprising:
    providing, by the user interface circuitry, an option for the user to include the at least one fact in the draft comment.

5. The method of claim 1 comprising:
    receiving, from a user device, a portion of a draft comment to be posted on the webpage as the draft comment is being created by a second user.

6. The method of claim 5, comprising:
    determining, by the entity extraction and linking circuitry, the first entity from the portion of the draft comment.

7. The method of claim 6, comprising:
    providing, by the user interface circuitry, the at least one fact to the second user before the draft comment is posted on the webpage.

8. The method of claim 1 comprising:
    determining, by the entity extraction and linking circuitry, at least one attribute referenced within at least one individual comment of the plurality of individual comments within the first sub-conversation, the at least one attribute associated with the first entity; and
    querying the knowledge base, by the querying circuitry, for the at least one fact relating to the first entity and the at least one attribute.

9. The method of claim 1 comprising:
    determining, by sentiment detection circuitry, a polarized sentiment toward the first entity within at least one individual comment of the plurality of individual comments within the first sub-conversation.

10. The method of claim 9 comprising:
    determining, by the sentiment detection circuitry, at least one polarized entity from the first entity within the first sub-conversation in response to determining a polarized sentiment toward the first entity; and
    querying the knowledge base, by the querying circuitry, for the at least one fact relating to the at least one polarized entity.

11. An apparatus comprising:
    comment segmentation circuitry configured to:
        receive a comment string posted on a webpage comprising a plurality of individual comments;
        responsive to determining that a frequency of appearance of a first individual word having a first word vector or a second individual word having a second word vector similar to the first word vector changes a threshold amount from a first portion of the comment string having a first frequency of at least one of the first individual word or the second individual word to a second portion of the comment string having a second frequency of at least one of the first individual word or the second individual word, detect at least one topic shift in the comment string to indicate a delineation between at least two sub-conversations; and based upon the delineation between the at least two sub-conversations, segment the plurality of individual comments into the at least two sub-conversations comprising a first sub-conversation and a second sub-conversation;

entity extraction and linking circuitry configured to determine at least two entities referenced in the first sub-conversation as a shared topic;

sentiment detection circuitry configured to:
determine, within the plurality of individual comments within the first sub-conversation, a first polarized sentiment toward a first entity of the at least two entities associated with the shared topic and a second polarized sentiment toward a second entity of the at least two entities associated with the shared topic; and responsive to determining that the first polarized sentiment is more polarized than the second polarized sentiment, select the first entity associated with the first polarized sentiment but not the second entity associated with the second polarized sentiment in association with the shared topic from amongst the at least two entities;

querying circuitry configured to query a knowledge base for at least one fact relating to the first entity; and user interface circuitry configured to:
responsive to accessing the at least one fact:
automatically generate a new comment comprising the at least one fact that has been accessed; and
automatically post the new comment comprising the at least one fact within a sub-conversation determined to be pertinent to the new comment;
provide an option for one or more users to provide feedback corresponding to a pertinence of the new comment to the sub-conversation;
receive, via the option, feedback data corresponding to the pertinence of the new comment to the sub-conversation; and
evaluate the feedback data and adjusting one or more models of a fact machine based upon the feedback data.

12. The apparatus of claim 11 wherein the sub-conversation comprises the first sub-conversation.

13. The apparatus of claim 11 comprising:
communication interface circuitry configured to receive, from a user device, a draft comment to be posted on the webpage prior to the draft comment being posted on the webpage;
wherein the entity extraction and linking circuitry is configured to determine the first entity from the draft comment; and
wherein the user interface circuitry is configured to provide the at least one fact to a user before the draft comment is posted on the webpage.

14. The apparatus of claim 11 comprising:
communication interface circuitry configured to receive, from a user device, a portion of a draft comment to be posted on the webpage as the draft comment is being created by at least one user;
wherein the entity extraction and linking circuitry is configured to determine the first entity from the portion of the draft comment; and
wherein the user interface circuitry is configured to provide the at least one fact to a user before the draft comment is posted on the webpage.

15. The apparatus of claim 11 wherein the first sub-conversation discusses a first aspect of a topic represented by a first text string and the second sub-conversation discusses a second aspect of the same topic represented by a second text string.

16. The apparatus of claim 15 wherein determining that a frequency of appearance changes comprises:
determining that multiple instances of at least one of the first individual word or the second individual word appear in the first portion of the comment string; and
determining that less than a threshold number of instances of at least one of the first individual word or the second individual word appear in the second portion of the comment string.

17. The apparatus of claim 11 wherein the entity extraction and linking circuitry is configured to determine at least one attribute referenced within at least one individual comment of the plurality of individual comments within the first sub-conversation, the at least one attribute associated with the first entity; and
wherein the querying circuitry is configured to query the knowledge base for the at least one fact relating to the first entity and the at least one attribute.

18. The apparatus of claim 11 wherein the first entity is different than the second entity and the first polarized sentiment is different than the second polarized sentiment.

19. The apparatus of claim 11 wherein the sentiment detection circuitry is configured to determine the first polarized sentiment by analyzing words surrounding the first entity.

20. A non-transitory computer-readable medium comprising instructions that when executed perform operations comprising:
receiving, by comment segmentation circuitry, a comment string posted on a webpage comprising a plurality of individual comments;
responsive to determining that a frequency of appearance of a first individual word having a first word vector and one or more second individual words having one or more second word vectors within a word vector similarity threshold of to the first word vector changes a threshold amount from a first portion of the comment string having a first frequency of the first individual word and the one or more second individual words to a second portion of the comment string having a second frequency of the first individual word and the one or more second individual words, detecting, by the comment segmentation circuitry, at least one topic shift in the comment string to indicate a delineation between at least two sub-conversations;
based upon the delineation between the at least two sub-conversations, segmenting, by the comment segmentation circuitry, the plurality of individual comments into the at least two sub-conversations comprising a first sub-conversation discussing a first aspect of a topic represented by a first text string and a second sub-conversation discussing a second aspect of the same topic represented by a second text string, wherein the second aspect is different than the first aspect but the second text string is the same as the first text string;

determining, by entity extraction and linking circuitry, at least a first entity referenced in the first sub-conversation as the same topic and a second entity referenced in the second sub-conversation as the same topic;

querying, by querying circuitry, a knowledge base for at least one fact relating to at least one of the first entity or the second entity;

responsive to accessing the at least one fact:
  automatically generating a new comment comprising the at least one fact that has been accessed; and
  automatically posting the new comment comprising the at least one fact within a sub-conversation determined to be pertinent to the new comment;

providing, by user interface circuitry, an option for one or more users to provide feedback corresponding to a pertinence of the new comment to the sub-conversation;

receiving, via the option, feedback data corresponding to the pertinence of the new comment to the sub-conversation; and evaluating the feedback data and adjusting one or more models of a fact machine based upon the feedback data.

* * * * *